United States Patent

Simon

[11] Patent Number: 6,033,172
[45] Date of Patent: Mar. 7, 2000

[54] BALE TURNING APPARATUS

[75] Inventor: Richard L. Simon, Wichita, Kans.

[73] Assignee: Maize Corporation, Maize, Kans.

[21] Appl. No.: 09/253,421

[22] Filed: Feb. 19, 1999

[51] Int. Cl.[7] .................................................. A01D 90/00
[52] U.S. Cl. ........................ 414/24.5; 414/482; 414/483; 414/911
[58] Field of Search ................................. 414/24.5, 789.7, 414/111, 911, 477, 478, 482, 483; 298/9

[56] References Cited

U.S. PATENT DOCUMENTS

| | | |
|---|---|---|
| 2,853,171 | 9/1958 | Matthews . |
| 3,161,008 | 12/1964 | Shepley et al. . |
| 3,243,028 | 3/1966 | Tufts . |
| 3,385,456 | 5/1968 | Snider .................................. 414/789.7 |
| 4,162,135 | 7/1979 | Seymour ................................. 414/780 |
| 4,498,829 | 2/1985 | Spikes .................................... 414/24.5 |
| 4,594,836 | 6/1986 | Good ..................................... 414/24.52 |
| 4,778,327 | 10/1988 | Tufenkian et al. ...................... 414/477 |
| 5,024,152 | 6/1991 | Girard . |
| 5,405,229 | 4/1995 | Tilley et al. ............................ 414/111 |
| 5,816,764 | 10/1998 | Bohata ................................... 414/477 |
| 5,816,765 | 10/1998 | Pijanowski .................................. 298/9 |
| 5,842,823 | 12/1998 | Kohnen et al. ......................... 414/477 |

FOREIGN PATENT DOCUMENTS

WO92/00912   1/1992   WIPO ................................... 414/477

Primary Examiner—Douglas Hess
Attorney, Agent, or Firm—Edward L. Brown, Jr.

[57] ABSTRACT

The present invention provides a turning apparatus for receiving large bales from a baler, the apparatus includes a table for receiving the large bales which turns the bale ninety degrees from its original position as it exits from a baler and then tilts the table downward thus rolling the bale off the table. The table angle and its turning speed are adjustable for varying the position in which it is deposited off of the table.

5 Claims, 3 Drawing Sheets

BALE TURNING APPARATUS

BACKGROUND OF THE INVENTION

The present invention relates generally to large bale handling devices and, more particularly, to a bale discharge table which trailers behind the discharge chute of a baler to rotate the bale 90° from its discharge chute while tilting the table sufficiently to roll the bale onto the ground either off or on its bale twines.

Historically since the beginning of baling of forage crops, the size of bales has gradually increased to what we have today which are either large cylindrical round bales or square bales which can weigh between 600 and 2000 pounds. Since the size and weight of these large bales do not permit them to be handled by manual labor, various mechanical means for handling the bales have been developed. While there are several types of bale handling devices available, most of them involve a multiple spearing type device mounted on either a tractor front end loader or a 3-point hitch which drives one or more spears into the side of the bale and then lifts the bale for either transport or loading. These bale loaders follow the baler as it moves through the field and since the bales are not ejected with the sides of the bale facing the loaders, it requires the bale loader, each time it engages a bale to swing off to the side, making a wide turn and engage the side of the bale before it can be lifted. This extra movement in the field is a waste of energy and time which has encouraged equipment manufacturers to develop a turning apparatus to turn the bales 90° as they exit the outlet chute of the baler such as taught in U.S. Pat. No. 4,162,135 to Seymour. The device in the above-mentioned patent is utilized with round rather than square bales and it achieves the turning by dragging one end of the bale 90° after it is already on the ground. The apparatus of the present invention rotates the big square bale while it is still on a table before it is dumped onto the ground.

In the prior art, most balers of either round or square bales wrap their bales with twine in a vertical plane so as the bales exit the outlet chute the twine is on the top and bottom of the bale which is undesirable to some for various reasons. To keep the bales off their twine, the bales were supported on one side at the exit chute thus causing them to roll from the unsupported side 90° as they hit the ground. This method is taught in the following prior art patents of Matthews U.S. Pat. No. 2,853,171; Shepley et al U.S. Pat. No. 3,161,008; Tufts U.S. Pat. No. 3,243,028; and Girard U.S. Pat. No. 5,024,152.

SUMMARY OF THE INVENTION

The present invention rolls its bales off the twines differently than the above-mentioned patents by tilting its table downward approximately 45° and rolling the bale onto the ground. Prior to rolling the bale onto the ground, the bale is initially moved onto a rotating table which turns the bale through 90° before it is slid to the ground, thus allowing the side of the bale to be directly engaged by a loader without having to maneuver the loader.

The principal object of the present invention is to provide a turning apparatus for large square bales which turns the bale 90° from its position exiting the baler and then tilts the table downward thus rolling the bale off the table and off its twines.

Another object of the invention is to provide a bale turning apparatus wherein the bale can be deposited on the ground either on its twines or off its twines by adjusting the table angle and table speed as the operator may choose.

A further object of the present invention is to provide a bale turning apparatus which is fully automatic with a discharge function which can vary to suit the operator.

BRIEF DESCRIPTION OF THE DRAWINGS

FIG. 4 is a partial sectional view taken along lines 4—4 of FIG. 1.

DESCRIPTION OF THE PREFERRED EMBODIMENT

Figure 1:
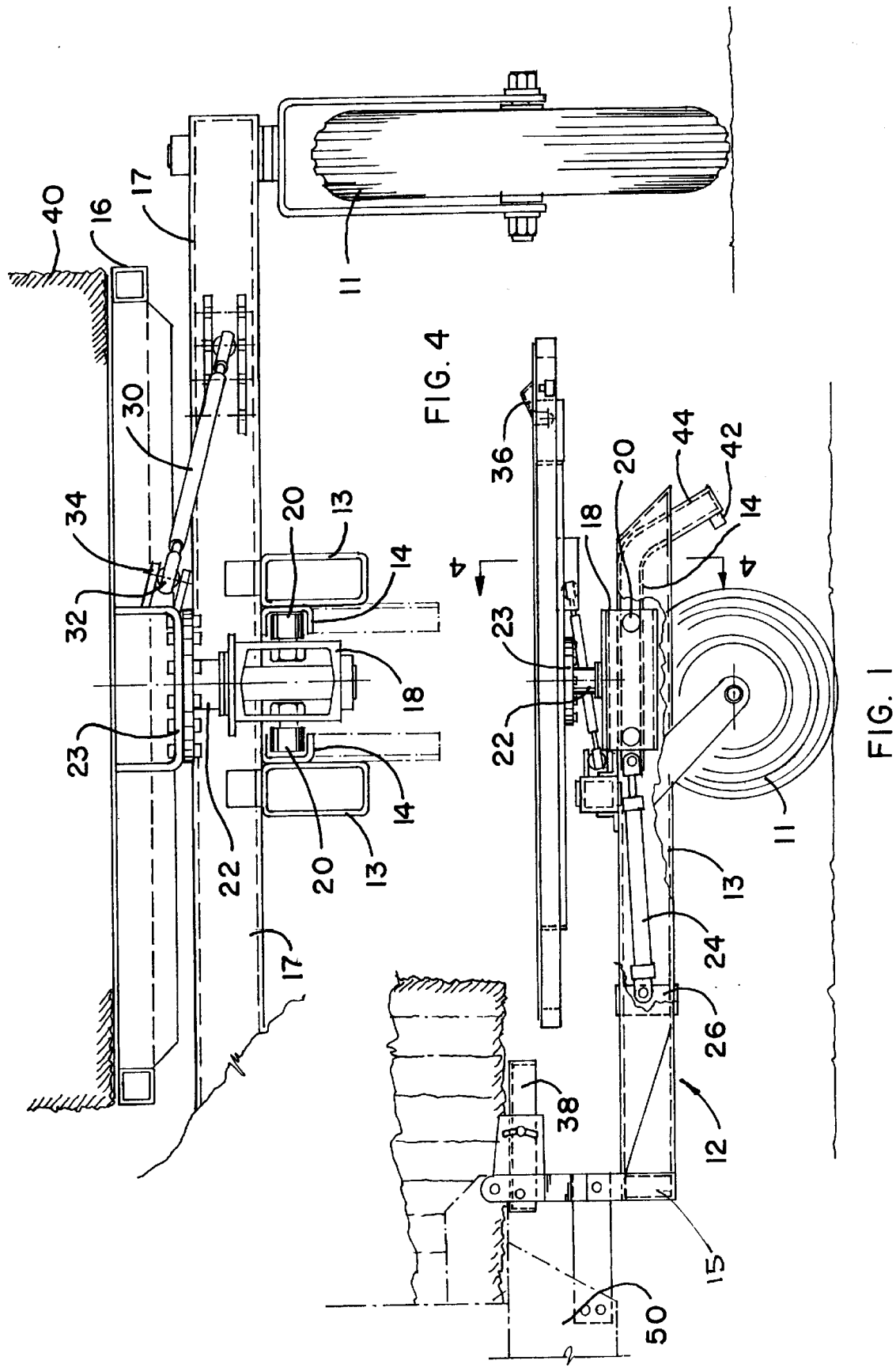
FIG. 1 is a side elevational view of the bale turner with the table in its receiving position.

The bale turning apparatus of the present invention is generally described as reference numeral 10 as shown in all the Figures. The bale turner 10 attaches to the rear of a baler through bolts 52 which allows the bale turner 10 to pivot about a horizontal axis with the baler. The baler is not shown in the drawing; however, the baler outlet chute 50 is shown in FIGS. 1 and 2 with a plurality of bales 40 and 40' moving there along.

The bale turner 10 comprises a frame 12 riding on a pair of castered wheels 11 with the front portion of the frame 12 attached to the baler through lateral cross member 15. Mounted on frame 12 is a turn table 16 which is roughly 4 feet by 8 feet, the size of the bale, and is pivotally mounted to carriage 18 through a pivot pin 22 in the center of the table 16. The carriage 18 having four wheels 20, rides in a pair of rails 14, which are channel shaped, containing the four wheels 20. The rails 14 allow only lineal longitudinal movement of the carriage 18. The rails 14 are attached to the inside of longitudinal frame members 13 as best seen in FIGS. 1 and 2. The carriage 18 supporting table 16 is moved through the action of a double acting hydraulic cylinder 24 which is mounted on its left end as seen in FIG. 1 to cross member 26 and at its rod end to a lug 28 on carriage 18. Both ends of cylinder 24 are conventional clevis pivoted connections thereby permitting carriage 18 to rotate downward as carriage 18 moves into the down turned portion 44 of rails 14 as seen in FIG. 1 and FIG. 3. The angle of the down turned portion 44 exceeds 45° and thus permits the table 16 to be tilted at variable angles of tilt depending on how far carriage 18 is allowed to advance. In FIG. 3, carriage 18 is shown at its maximum angle of tilt with a table angle of approximately 45°. That angle of tilt is controlled by limit switches 42 positioned on rail 14.

While the tilt of table 16 is achieved by carriage 18 engaging the down turned portion 44 of the rail, the rotation of table 16 is affected by rigid link 30. When viewing FIG. 2, it can be seen that link 30 pivotally attaches to a mounting bracket 34 on lateral cross member 17 of frame 12 while the opposite end of link 30 pivotally attaches to the underside of table 16 through a similar mounting bracket 34. Mounting brackets 34 illustrate multiple mounting points which can be adjusted to change the turning angle of table 16. The turning angle of table 16 is also affected by how far carriage 18 extends from its FIG. 2 position. Both ends of link 30 include a ball joint type clevis thus allowing the joints to move in two planes as shown in FIG. 4, which is taken along Line 4—4 of FIG. 1.

Figure 2:
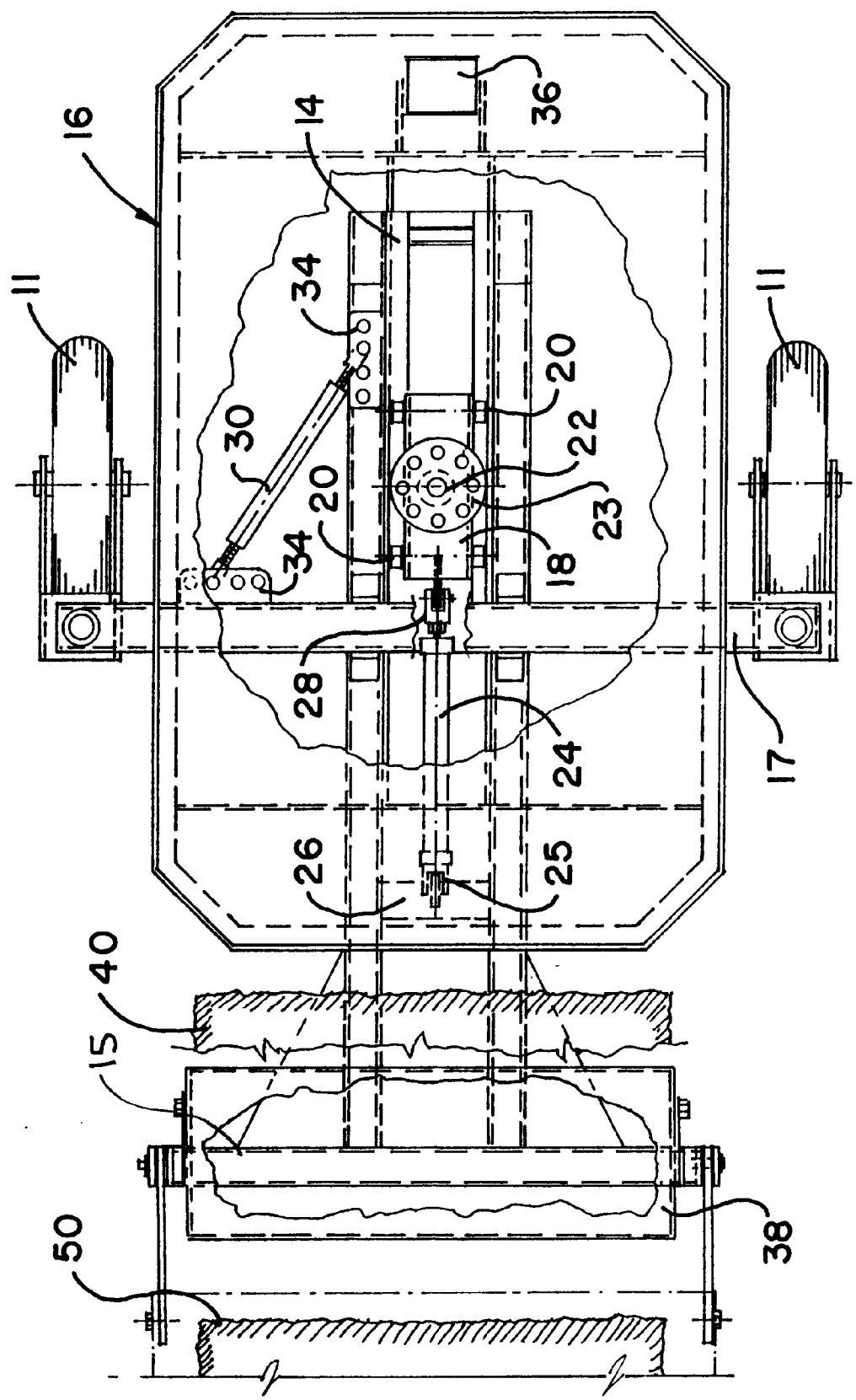
FIG. 2 is a top plan view of the bale turner with the table in its receiving position.
Figure 3:
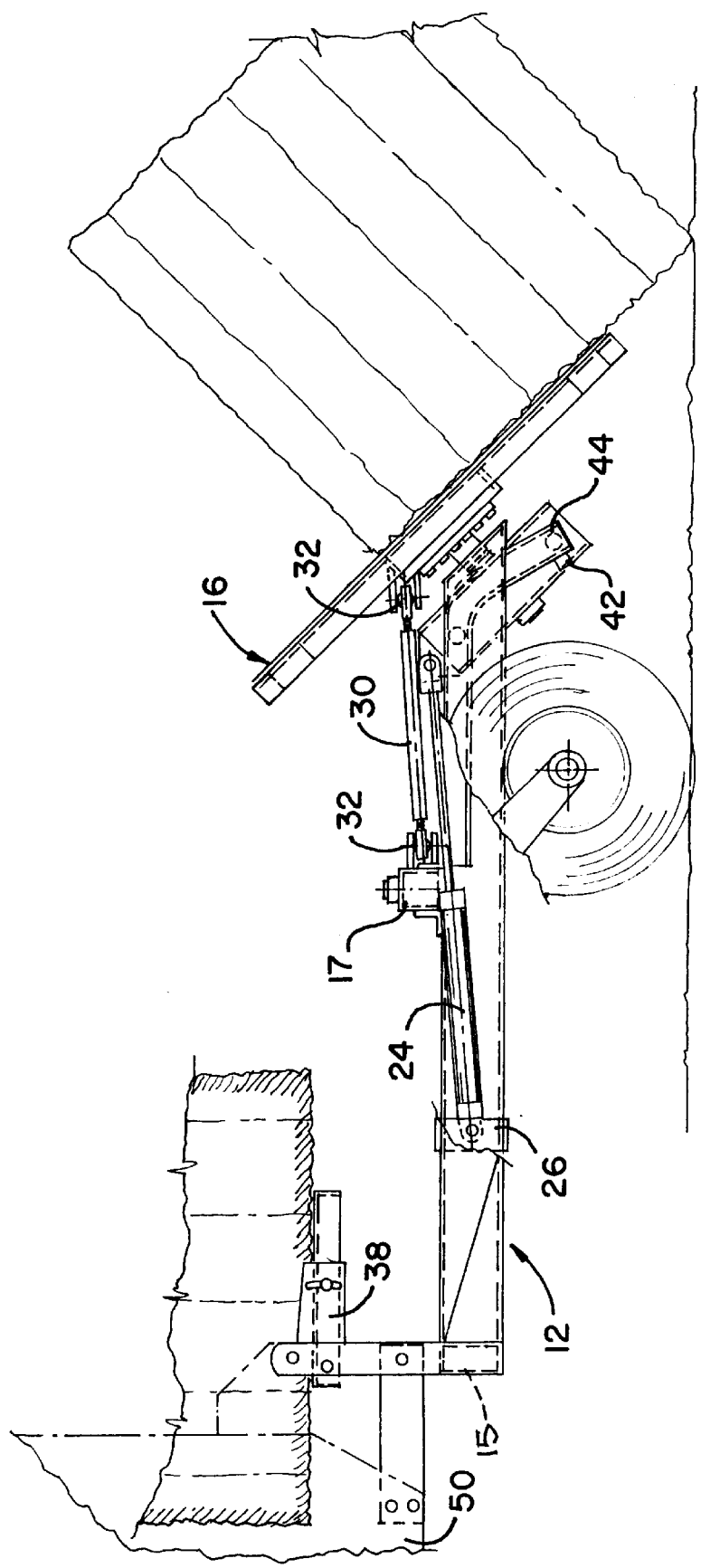
FIG. 3 is a side elevational view of the bale turner with its table in its ejecting position.

Carriage 18 includes a journal for pivotally supporting pin 22 which in turn is attached to table 16 through a flange 23, as seen in FIG. 2. The hydraulic power source for moving table 16 which is not shown can be supplied from a power source on the baler or tractor which is conventionally done in many applications.

Located at the rear edge of table 16 is an actuating switch 36 which is made as the bale comes in contact therewith for initiating the turning and depositing of the bale on the ground as described hereafter.

OPERATION

As the baler moves across the field and bales the particular forage crop, the bales 40 and 40' are slowly moved down the outlet chute 50 by bale guide 38 onto table 16. As bale 40 reaches its centered position on table 16, switch 36 is actuated causing cylinder 24 to extend at a preselected rate which moves carriage 18 rightwardly as seen in the drawings towards its fully extended position as seen in FIG. 3. As the carriage initially moves, link 30 will cause the table to rotate in a counterclockwise direction as seen in FIG. 2 so that the upper left corner of table 16 as seen in FIG. 2 clears the upstream bale before the table begins to tilt.

As the front wheels 20 in carriage 18 begin to engage the down turned portion 44 of the rails, the table will begin to tilt downward and will complete its tilt once a limit switch 42 is engaged. Once the angle of tilt exceeds the friction between the table and the bale, the bale will slide to the ground either on or off its bale twines depending upon the choice of the operator by way of increasing or slowing the rate of cylinder movement.

While the preferred structure in which the principles of the present invention have been incorporated is shown and described above, it is to be understood that invention is not limited to the particular structure presented in the drawings and specification. In fact, different means may be employed in the practice of the broader aspects of the invention such as the two moving functions of the table. The scope of dependent claims is intended to encompass all obvious changes in the details, materials and arrangement of parts which will occur to one skilled in the art upon reading this disclosure. It is also to be understood that the teachings of the present invention are also applicable to a round bale baler.

Having described the invention, what is claimed is:

1. A bale turning apparatus for use with a bale-forming machine having a bale outlet chute aligned with the front of the turning apparatus, the apparatus comprising:
   a frame attached to the baler;
   a turning table pivotally mounted at its center for rotation in a horizontal plane for positioning in alignment with the outlet chute;
   at least one horizontal rail member longitudinally positioned on said frame having a forward end and a down turned portion at the rear end thereof;
   a wheel-mounted carriage mounted on said rail having a pivot pin thereon for pivotally supporting said table;
   a linear actuator supplied by a power source attached at one end to the frame and the other end to the carriage for movement of the carriage along said rail to the down turned portion;
   a rigid link pivotally connecting the frame to the underside of said table offset from the table pivot pin whereby as the table and carriage move along the rail the table rotates through an angular path;
   stop means on the frame which stops the carriage on the down turned portion of the rail after the table has been rotated and tilted causing the bale to slide to the ground.

2. A bale turning apparatus as set forth in claim 1 wherein the frame is a wheel supported trailer for pivotally hitching to the baler, and the table lies in a common plane with the outlet chute.

3. A bale turning apparatus as set forth in claim 1 wherein the stop means has a plurality of stopping points on the down turned portion whereby the table can be stopped at different tilting angles.

4. A bale turning apparatus as set forth in claim 1 including sensing means in the table to sense the position of the bale on the table which actuates the linear actuator to rotate, tilt and slide the bale thereon onto the ground.

5. A bale turning apparatus as set forth in claim 1 wherein the stop means has a plurality of stopping points on the down turned portion whereby the table can be stopped at different tilting angles and sensing means in the turning table to sense the position of the bale on the table which actuates the linear actuator to rotate, tilt and slide the bale thereon onto the ground.

* * * * *